United States Patent
Alstrin

(10) Patent No.: US 11,650,141 B2
(45) Date of Patent: *May 16, 2023

(54) DETERMINATION OF DYNAMIC PARAMETERS FOR ADAPTIVE ACTUATOR CONTROL

(71) Applicant: Waters Technologies Corporation, Milford, MA (US)

(72) Inventor: Kevin Alstrin, Excelsior, MN (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,541

(22) Filed: Aug. 25, 2021

(65) Prior Publication Data

US 2021/0381940 A1 Dec. 9, 2021

Related U.S. Application Data

(63) Continuation of application No. 16/149,695, filed on Oct. 2, 2018, now Pat. No. 11,119,015.

(60) Provisional application No. 62/569,808, filed on Oct. 9, 2017.

(51) Int. Cl.
  *G01N 3/02* (2006.01)
  *G01N 3/32* (2006.01)

(52) U.S. Cl.
  CPC .............. *G01N 3/02* (2013.01); *G01N 3/32* (2013.01); *G01N 2203/0208* (2013.01)

(58) Field of Classification Search
  CPC ..... G01N 3/02; G01N 3/32; G01N 2203/0208
  See application file for complete search history.

(56) References Cited

U.S. PATENT DOCUMENTS

| 3,784,798 A | 1/1974 | Beadle et al. |
| 3,836,757 A | 9/1974 | Nachtigal et al. |
| 5,431,062 A | 7/1995 | Baratta |

(Continued)

FOREIGN PATENT DOCUMENTS

| CN | 2682407 Y | 3/2005 |
| EP | 2522980 A2 | 11/2012 |

(Continued)

OTHER PUBLICATIONS

Notice of Allowance in U.S. Appl. No. 16/149,615 dated Mar. 23, 2021.

(Continued)

*Primary Examiner* — Lisa M Caputo
*Assistant Examiner* — Alex T Devito
(74) *Attorney, Agent, or Firm* — Schmeiser, Olsen & Watts LLP

(57) ABSTRACT

An actuator control system, mechanical testing system, and method for adaptive control of an actuator of a mechanical testing device is provided. The method includes applying a mechanical load to the specimen with the actuator, resulting in receiving a load sensor signal from a load sensor and a displacement sensor signal from a displacement sensor, deriving lumped dynamics of the mechanical testing device by analyzing a phase and magnitude relationship between a current command of a motor of the mechanical testing device and a resultant deflection of the specimen, and controlling the actuator based on the derived lumped dynamics of the mechanical testing device such that the controlling results in a stable motion.

20 Claims, 9 Drawing Sheets

(56) References Cited

U.S. PATENT DOCUMENTS

| | | | |
|---|---|---|---|
| 8,768,641 | B2 | 7/2014 | Lindenstruth |
| 9,366,692 | B2 | 6/2016 | White et al. |
| 9,495,038 | B2 | 11/2016 | Young |
| 9,562,960 | B2 | 2/2017 | Kolipaka et al. |
| 10,571,379 | B2 | 2/2020 | Oliver et al. |
| 2004/0020276 | A1 | 2/2004 | Kwon et al. |
| 2005/0120802 | A1 | 6/2005 | Schulz |
| 2005/0267695 | A1 | 12/2005 | German |
| 2010/0280787 | A1 | 11/2010 | White et al. |
| 2011/0092798 | A1 | 4/2011 | Kolipaka et al. |
| 2011/0288791 | A1 | 11/2011 | Jeppesen et al. |
| 2012/0131702 | A1 | 5/2012 | Shi et al. |
| 2014/0345358 | A1 | 11/2014 | White et al. |
| 2016/0224158 | A1 | 8/2016 | Young |
| 2016/0274142 | A1 | 9/2016 | White et al. |
| 2017/0284912 | A1 | 10/2017 | Oliver et al. |
| 2019/0107472 | A1 | 4/2019 | Alstrin |

FOREIGN PATENT DOCUMENTS

| | | |
|---|---|---|
| GB | 2282228 A | 3/1995 |
| GB | 2467184 A | 7/2010 |
| WO | 2007004993 A1 | 1/2007 |

OTHER PUBLICATIONS

International Preliminary Report on Patentability in PCT/US2018/053912 dated Apr. 23, 2020.
International Search Report & Written Opinion in PCT/US2018/053899 dated Jan. 17, 2019; 15 pages.
Farsi, et al. "Full deflection profile calculation and Young's modulus optimization for engineered high performance materials," Scientific Reports, Apr. 11, 2017.
Non-Final Office Action in U.S. Appl. No. 16/149,615 dated Oct. 7, 2020.
International Search Report & Written Opinion in PCT/US2018/053912 dated Jan. 22, 2019; 13 pages.
Plummer, A.R. "Control techniques for structural testing: a review," Proceedings of the Institution of Mechanical Engineers, Journal of Engineering in Medicine, Mar. 1, 2007, vol. 221, No. 2, pp. 139-169.
International Search Report & Written Opinion in PCT/US2018/053952 dated Jan. 18, 2019; 16 pages.
Notice of Allowance in U.S. Appl. No. 16/149,695 dated May 12, 2021.
Final Office Action in U.S. Appl. No. 16/149,546 dated Apr. 15, 2021.
Non-Final Office Action in U.S. Appl. No. 16/149,546 dated Nov. 25, 2020.
International Preliminary Report on Patentability in PCT/US2018/053899 dated Apr. 16, 2020.
Non-Final Office Action in U.S. Appl. No. 16/149,695 dated Jan. 26, 2021.
International Preliminary Report on Patentability in PCT/US2018/05925 dated Apr. 23, 2020.
Non-Final Office Action in U.S. Appl. No. 16/149,546 dated Sep. 21, 2021.
Shang, Mingdong and Joe Butterfield, "The Experimental Test and FEA of a PKM (Exechon) in a Flexible Fixture Application for Aircraft Wing Assembly," Proceedings of the 2011 IEEE International Conference on Mechatronics and Automation, Aug. 7-10, Beijing, China, pp. 1225-1230.
Notice of Allowance in U.S. Appl. No. 16/149,546 dated Mar. 8, 2022.

DETERMINATION OF DYNAMIC PARAMETERS FOR ADAPTIVE ACTUATOR CONTROL

RELATED APPLICATION

This application is a continuation application of U.S. Nonprovisional patent application Ser. No. 16/149,695, filed Oct. 2, 2018 and titled "Determination of Dynamic Parameters for Adaptive Actuator Control," which claims the benefit of the earlier filing date of U.S. Provisional Patent Application No. 62/569,808, filed Oct. 9, 2017 and titled "Determination of Dynamic Parameters for Adaptive Actuator Control," the entireties of which are incorporated herein by reference.

TECHNICAL FIELD

The present invention relates to a mechanical testing system and methods for actuator control, and more specifically to embodiments of an actuator control system for adaptive control of an actuator using dynamic parameters of a mechanical testing device throughout a test of a specimen.

BACKGROUND

Mechanical testing systems are used for calculating, testing, and measuring material properties and parameters of various specimens. A single mechanical test system can be used to test many different material types. However, mechanical behavior properties, such as stiffness and damping, can vary greatly depending on the type of material being tested by the mechanical testing device, and on changes to temperature and frequency over the course of the test. Arbitrary, controlled actuator movements occur when a user sets up for a test or when a user tears down the machine after a test.

SUMMARY

An aspect relates generally to a method for adaptive control of an actuator during a test of a specimen using a mechanical testing device, the method comprising: applying a mechanical load to the specimen with the actuator, resulting in receiving a load sensor signal from a load sensor and a displacement sensor signal from a displacement sensor; deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and controlling the actuator based on the derived lumped dynamics of the mechanical testing device such that the controlling results in a stable motion.

Further aspects relate to a mechanical testing system comprising: a mechanical testing device, the mechanical testing device including a motor, a load sensor and a displacement sensor; and a computing system coupled to the mechanical testing device, the computing system having a processor, a memory device coupled to the processor, and a computer readable storage device coupled to the processor; wherein the storage device contains program code executable by the processor via the memory device to implement a method for adaptively controlling an actuator of a mechanical testing device during a test of a specimen, the method comprising: applying a mechanical load to the specimen with the actuator, resulting in receiving a load sensor signal from a load sensor and a displacement sensor signal from a displacement sensor; deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and controlling the actuator based on the derived lumped dynamics of the mechanical testing device such that the controlling results in a stable motion.

Further aspects include a computer program product, comprising a computer readable hardware storage device storing a computer readable program code, the computer readable program code comprising an algorithm that when executed by a computer processor of a computing system implements a method for adaptively controlling an actuator of a mechanical testing device during a test of a specimen, the method comprising: applying a mechanical load to the specimen with the actuator, resulting in receiving a load sensor signal from a load sensor and a displacement sensor signal from a displacement sensor; deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and controlling the actuator based on the derived lumped dynamics of the mechanical testing device such that the controlling results in a stable motion.

DETAILED DESCRIPTION

During a specimen test using dynamic mechanical analysis (DMA) machines, controlling a test system actuator to apply a prescribed load and displacement profile throughout the entire test when the test specimen dynamics are unknown and varying can be challenging. Some methods use a separate material characterization routine at a beginning of the test to derive control parameters; however, a separate material characterization routine may put unwanted duty cycles on the test specimen, and may only result in valid data near conditions the routine was run. When test conditions change, such as temperature or waveform frequency, the derived control parameters from characterization routines may result in unstable or unacceptable waveform tracking performance. A typical DMA test characterizes the mechanical properties of the specimen over a wide temperature and/or frequency range, which takes the material specimen through one or more phase transitions. Material dynamics (e.g. stiffness and damping) change drastically over a typical range of test conditions, especially through material phase transitions.

Thus, a need exists for a system and method for utilizing data collected as the test is being executed to adaptively control the test system actuator over the course of the test. The data collected during the actual DMA test may instantaneously characterize test system dynamics at a present test condition (e.g. temperature, frequency, etc.) and calculate an optimal control parameter(s) for a timeframe when the test is operating near those conditions. Accordingly, embodiments of the system and method disclosed herein adapt a plurality of control parameters over the course of a test and results in no additional duty cycle to the test specimen.

Figure 1:
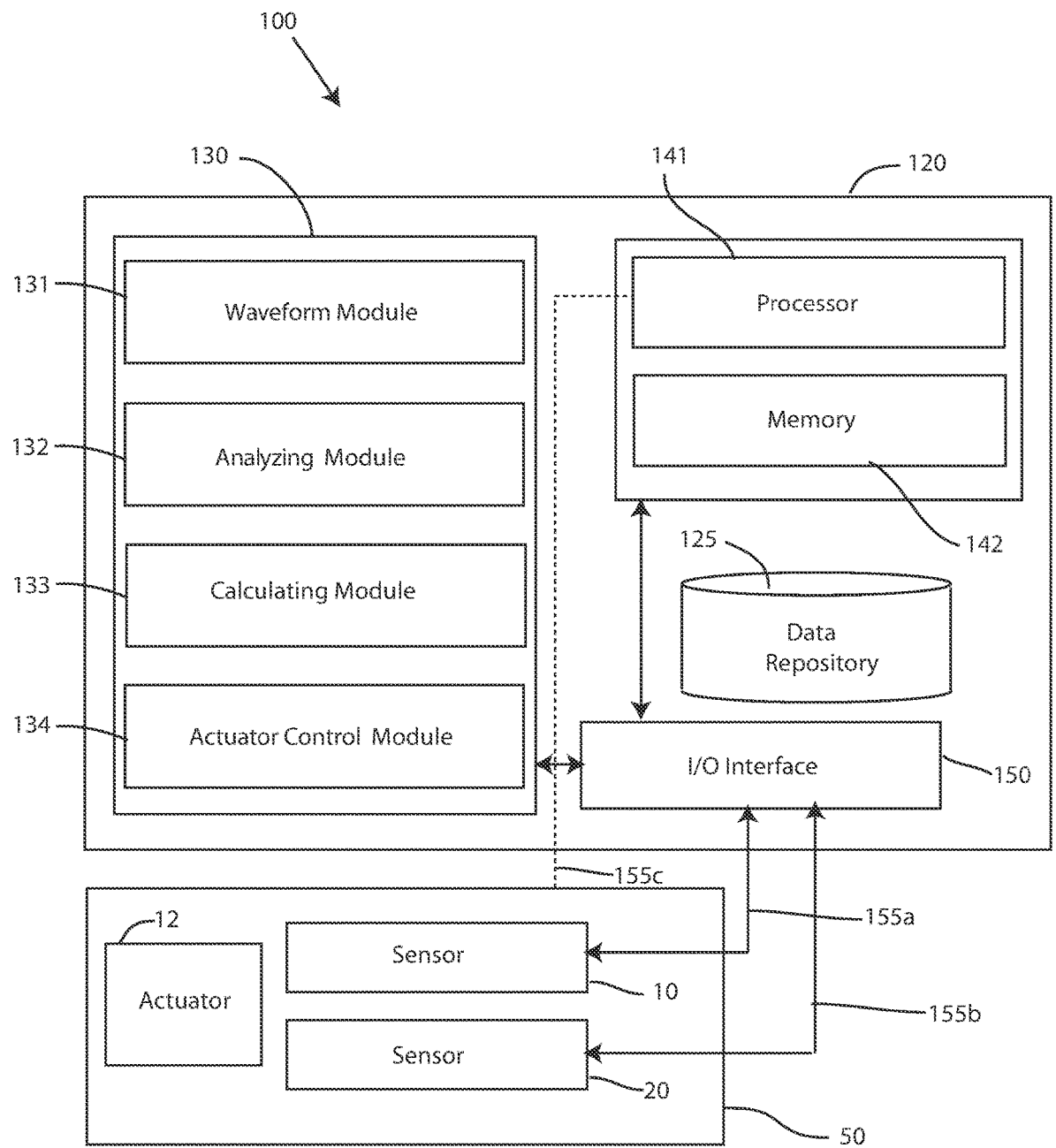
FIG. 1 depicts a block diagram of an actuator control system, in accordance with embodiments of the present invention.

Referring to the drawings, FIG. 1 depicts a block diagram of an actuator control system 100, in accordance with embodiments of the present invention. Embodiments of the actuator control system 100 may be a system for adaptive control of an actuator 12 using dynamic parameters of a mechanical testing device 50 throughout a test of a specimen. Embodiments of the actuator control system 100 may be useful for using the actuator 12 to manipulate dynamics of the mechanical testing device 50 to track a user's desired performance of the mechanical testing device 50. For example, the actuator control system 100 may calculate a current request to stabilize the actuator 12 in accordance with a user-input waveform for an entire test, even as environmental conditions affect the dynamic properties of the test specimen and the mechanical test system. Embodiments of the actuator control system 100 may use the actuator 12 and sensed motion measured by sensors 10, 20 to alter the dynamics of the system of the mechanical testing device 50. For example, the effective stiffness of the system can be altered by using the force output from the actuator to apply a resistive force proportional to the displacement (or displacement error) measured by a sensor. Similarly, an effective damping of the system can be altered by using a force output from the actuator 12 to apply a resistive force proportional to the velocity (or velocity error) measured by a sensor 10, 20.

The mechanical properties of the test specimen may be characterized during a test by using an actuator 12 to apply a load to the specimen. The applied load and resulting deflection of the material can be measured by one or more sensors 10, 20 of the mechanical testing device 50. A phase and magnitude relationship between the applied load and resultant deflection can be used to calculate a complex stiffness, a storage stiffness, a loss stiffness, and a phase. By taking into account a geometry of the specimen and a loading condition, generalized material properties can be calculated such as a storage modulus, a loss modulus, a phase, and tan($\delta$). In many cases, users want to maintain tight control over the loading and resultant deflection of the test specimen over the course of a test. Overstraining a material can break chemical bonds that temporarily or permanently alter the behavior of the material. Characterizing material dynamics while remaining within a linear viscoelastic range of the material may allow viscoelastic assumptions and data transformations to remain valid. In other embodiments, it may be desirable to test a material similar to how the test material will be loaded in an end application or end use of the test material. Accordingly, embodiments of the actuator control system 100 may operate to ensure that the actuator 12 responds in a manner prescribed by the user to execute a test as expected from the user.

Embodiments of the actuator control system 100 may be a dynamic mechanical analysis system with adaptive actuator control, an adaptive actuator control system, a system dynamics characterization system, and the like. Embodiments of the actuator control system 100 may include a computing system 120 and a mechanical testing device 50. Embodiments of the computing system 120 may be a computer system, a computer, personal computer, a desktop computer, a cellular phone, a user mobile device, a user computing device, a tablet computer, a dedicated mobile device, a laptop computer, a dedicated processor or microcontroller hardware, other internet accessible device or hardware and the like capable of being coupled to a mechanical testing device 50. Embodiments of the computing system 120 may include hardware functionality such as a speaker for emitting a sound, a display for displaying various plots, graphs, etc., with the ability to flash the display or portions of the content being displayed, a light emitting element for emitting a light, a receiver for receiving communications, a transmitter for transmitting signals, and other similar features and hardware of a computer associated with mechanical testing systems.

Figure 2:
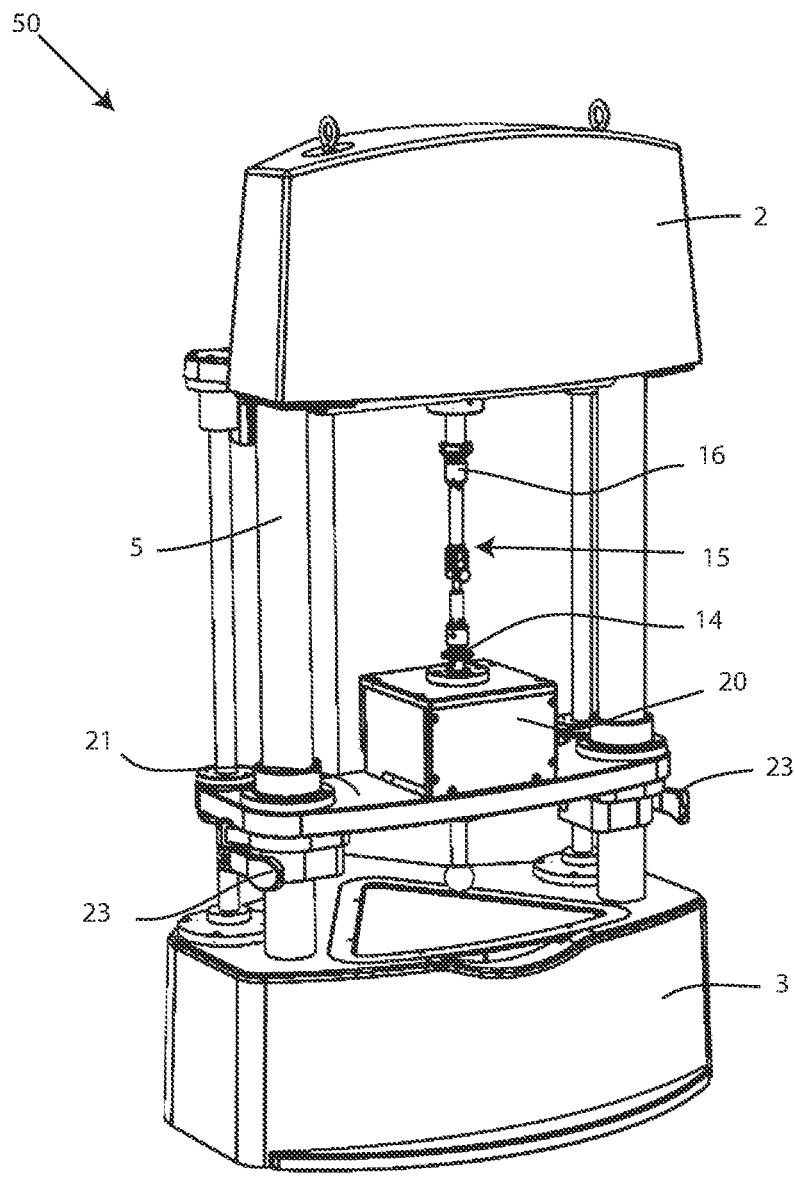
FIG. 2 depicts a perspective view of a mechanical testing device, in accordance with embodiments of the present invention.

Embodiments of the actuator compensation system 100 may include a mechanical testing device 50, coupled to the computing system 120. FIG. 2 depicts a perspective view of a mechanical testing device 50, in accordance with embodiments of the present invention. Embodiments of mechanical testing device 50 may be a mechanical testing system a testing device, a DMA machine, a sample tester, a properties analyzer for various specimens, a test instrument, a mechanical testing instrument, a device for testing samples, or any device for testing, measuring, and/or calculating a physical property, parameter, or characteristic of a physical specimen or section of material. In an exemplary embodiment, the mechanical testing device 50 may be used for calculating stiffness and damping properties of a particular sample. Moreover, embodiments of the mechanical testing device 50 may include a frame 5, which may be a general support structure of the mechanical testing device 50. The frame 5 may include an upper housing 2 and a lower housing 3. The actuator 12 may be positioned within the upper housing 3 to apply mechanical load on a specimen 15. Embodiments of the actuator 12 may be an electromagnetic motor, electric machine, pneumatic actuator, hydraulic actuator, a screw driven linear actuator, and the like. Embodiments of the actuator 12 may be controlled using state feedback control approaches, such as PID or a similar physics-based approach. Loading modes may be axial or torsional. A first sensor 10 (as depicted schematically in FIG. 1) may also be positioned within the upper housing 2. For instance, the first sensor 10 may be a displacement sensor that measures a displacement of the actuator 12 during application of a load over a given period of time. Embodiments of the first sensor 10 may be communicatively coupled to the computing system 120, as described in greater detail infra.

Further, embodiments of the mechanical testing device 50 may include a first fixture 16 and a second fixture 14 positioned between the upper housing 2 and the lower housing 2. Embodiments of the first fixture 16 and the second fixture 14 may be a fixture, a holder, a grip, a sample or specimen retention element, a sample/specimen holder, and the like, for securing the ends of reference specimen or sample 15 disposed between the fixtures 16, 14. A distance between the fixtures 16, 14 may be adjusted to secure the sample 15 between the fixtures 16, 14, by manipulating one or more clamps 23 to raise or lower a stage 21 of the mechanical testing device 50. Embodiments of the mechanical testing device 50 may also include a second sensor 20. Embodiments of the second sensor 20 may be a load sensor for measuring a force of an applied load by the actuator 12 over a given period of time. Embodiments of the second sensor 10 may be communicatively coupled to the computing system 120, as described in greater detail infra. In an exemplary embodiment, the second sensor 20 may be positioned below the second fixture, as shown in FIG. 2. However, embodiments of the second sensor 20 may be positioned above the first fixture 16.

Referring back to FIG. 1, embodiments of the mechanical testing device 50 may be communicatively coupled to the computing system 120. For instance, the mechanical testing device 50 may be coupled to a processor 141 of the computing system 120. Sensors 10, 20 of the mechanical testing device 50 may be communicatively coupled to the computing system 120 via an I/O interface 150. The sensors 10, 20 may be connected via an I/O interface 150 to computer system 120. The number of sensors 10, 20 connecting to computer system 120 via data bus lines 155a, 155b (referred to collectively as "data bus lines 155) may vary from embodiment to embodiment, depending on the parameters of a specimen or testing system being tested. As shown in FIG. 1, sensors 10, 20 (e.g. a displacement sensor 10 and load sensor 20) may transmit data or signals (e.g. "feedback data") received from the sensors 10, 20 by connecting to computing system 120 via the data bus lines 155 to an I/O interface 150. An I/O interface 150 may refer to any communication process performed between the computer system 120 and the environment outside of the computer system 120, for example, the sensors 10, 20 and mechanical testing device 50 via data bus line 155c. Input to the computing system 120 may refer to the signals or instructions sent to the computing system 120, for example the data signals collected by the sensors 10, 20, while output may refer to the signals sent out from the computer system 120 to the mechanical testing device 50, such as a signal (e.g. waveform) to actuate the actuator/motor of the mechanical testing device 50.

Furthermore, embodiments of the computing system 120 may be equipped with a memory device 142 which may store various data/information/code, and a processor 141 for implementing the tasks associated with the actuator control system 100. In some embodiments, an actuator control application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the actuator control application 130. Embodiments of the actuator control application 130 may be an interface, an application, a program, a module, or a combination of modules. In an exemplary embodiment, the actuator control application 130 may be a software application running on one or more back end servers, servicing a user personal computer over a network (not shown), and/or may be a software application running on the user personal computing device, or dedicated computing device for DMA machines.

The actuator control application 130 of the computing system 120 may include a waveform module 131, an analyzing module 132, a calculating module 133, and an actuator control module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the waveform module 131 may include one or more components of hardware and/or software program code for generating a motor current waveform for generating a motor current waveform for actuating an actuator 12 to apply a mechanical load to the specimen 15. For instance, embodiments of the waveform may be a motor or actuator current waveform, a carrier waveform, and the like. In an exemplary embodiment, the waveform generated by the waveform module 131 of the computing system 120 may be a periodic waveform, such as a sinusoid, triangle, or square waveform. Embodiments of the waveform generated by the waveform module 131 may be a current request from the computing system 120 associated with the waveform to be converted into a voltage and/or current to be applied to the actuator 12. Current applied to the actuator 12 may then actuate the actuator 12 for applying a mechanical load to the specimen 12. For example, embodiments of the waveform module 131 may increase an amplitude of current applied to the actuator so that the computing system 120 receives, perceives, measures, etc. a displacement signal from the displacement sensor 10 and a load sensor signal from the load sensor 20.

Figure 3:
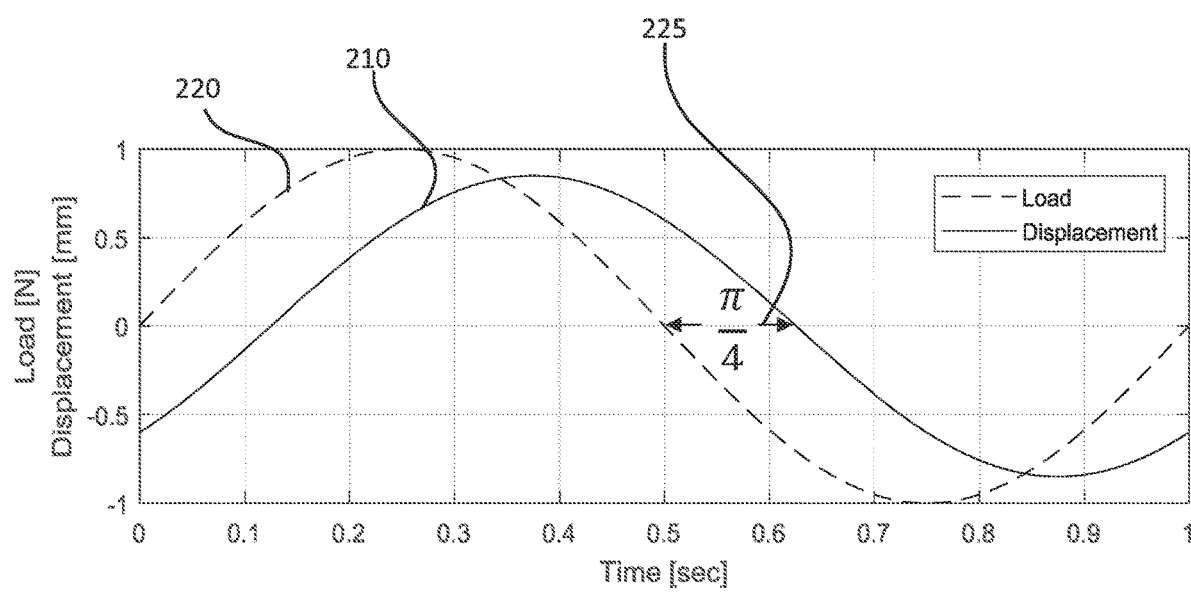
FIG. 3 depicts a graph representing a load waveform versus displacement waveform, in accordance with embodiments of the present invention.

Referring still to FIG. 1, embodiments of the computing system 120 may further include an analyzing module 132. Embodiments of the analyzing module 132 may include one or more components of hardware and/or software program code for analyzing a load sensor signal from a load sensor 20 and a displacement sensor signal from a displacement sensor 10 to determine a plurality of dynamic characteristics of the mechanical testing device 50. For instance, embodiments of the analyzing module 132 may determine a plurality of parameters of the specimen 15 and eventually parameters of a lumped system by analyzing the load sensor signal and/or the displacement sensor signal, described in greater detail infra. As described above, the mechanical properties of a material may be characterized by applying a dynamic load to the material 15 while measuring the applied load and the resulting deflection with the load sensor 20 and the displacement sensor 10. The dynamic loading of the specimen 15 may be a sinusoid or similar smooth periodic waveform. The phase and magnitude relationship between the applied load and resultant deflection may be used to calculate a complex stiffness, a storage stiffness, and a loss stiffness. The complex stiffness, storage stiffness, and loss stiffness may represent a second-order approximation of the dynamics of the material specimen 15. FIG. 3 depicts a graph representing a load waveform versus displacement waveform, in accordance with embodiments of the present invention. In the load and displacement waveforms shown in FIG. 3 the load (force) sensor signal 220 leads the deflection (displacement) sensor signal 210. The load sensor signal 220 may lead the displacement sensor signal 210 in practice because the load happens first (i.e. cause) and the deflection is the result (i.e. effect). In the embodiment shown in FIG. 3, the phase difference between load and displacement is π/4, the load sensor signal 220 has an amplitude of 1, and the displacement sensor signal 210 has an amplitude of 0.85.

Figure 4:
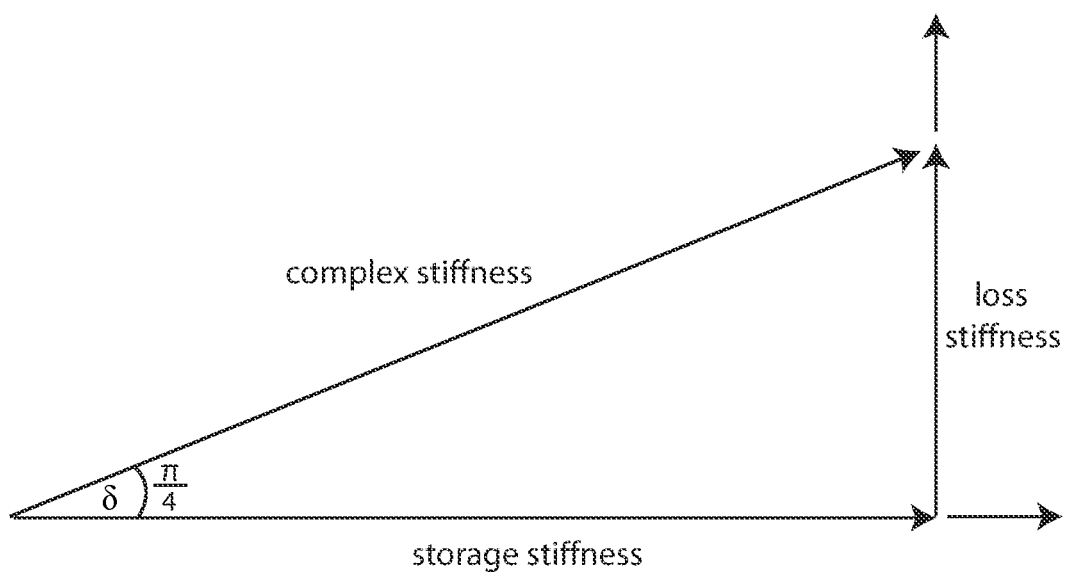
FIG. 4 depicts a specimen stiffness phasor diagram, in accordance with embodiments of the present invention.

FIG. 4 depicts a specimen stiffness phasor diagram, in accordance with embodiments of the present invention. The phasor diagram depicted in FIG. 4 shows a complex stiffness, which is a ratio of load amplitude to displacement amplitude and is made up of the vector sum of the storage stiffness along a real axis and a loss stiffness along an imaginary axis. Storage stiffness is a measure of the spring rate of the material and loss stiffness is a measure of the damping of the material. Storage stiffness may be calculated with the following equation:

$$\text{Storage stiffness} = \text{complex stiffness} * \cos(\delta) \quad \text{Eq. 1}$$

Storage stiffness is a measure of how much energy will be returned when a material is deflected and then allowed to rebound. Loss stiffness is a measure of how much energy gets dissipated as heat or friction. Loss stiffness may be calculated with the following equation:

$$\text{Loss stiffness} = \text{complex stiffness} * \sin(\delta) \quad \text{Eq. 2}$$

Material characterization in the form of complex, storage, and loss modulus may be presented in the form of an effective mass, spring rate, and damping constant. These parameters are related according to Newton's 2'nd Law of Motion as shown below:

$$\Sigma F \text{ specimen} = M \text{ specimen}_{eff} \ddot{x} + B\dot{x} + Kx \quad \text{Eq. 3}$$

wherein: F=force, x=deflection, B=damping coefficient of the specimen, K=spring rate of the specimen, and M=effective mass of the specimen. Embodiments of the analyzing module 132 may then calculate a transfer function, such as a Laplace transform, of Eq. 3. Using the Laplace transform operator, s, a transfer function may be written that relates resultant deflection to an applied force:

$$X(s)/F(s) = 1/(Ms^2 + Bs^2 + K) \quad \text{Eq. 4}$$

Eq. 4 may be referred to as a specimen compliance transfer function. The specimen compliance transfer function is in units of deflection divided by force, which is compliance, or the inverse of stiffness. The analyzing module 132 may calculate the inverse of Eq. 4, as follows:

$$F(s)/X(s) = Ms^2 + Bs^2 + K \quad \text{Eq. 5}$$

Eq. 5 may be referred to as a specimen stiffness transfer function. Further, embodiments of the analyzing module 132 may substitute "jω" for the Laplace operator "s" to derive the following equation:

$$F(j\omega)/X(j\omega) = M(j\omega)^2 + B(j\omega) + K \quad \text{Eq. 6}$$

Eq. 6 may be referred to as a stiffness transfer function.

Figure 5:
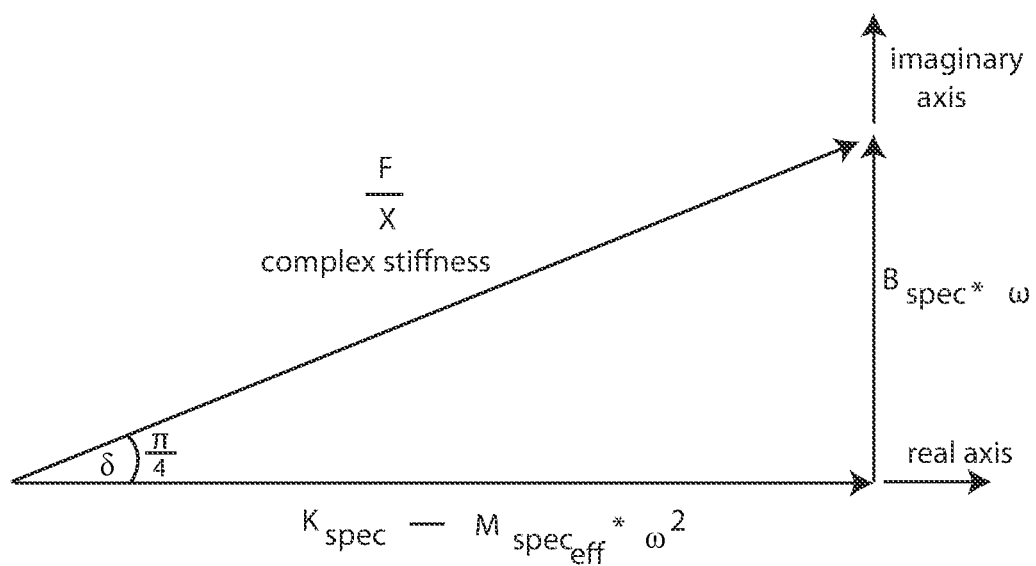
FIG. 5 depicts a phasor diagram of the test specimen equation of motion, in accordance with embodiments of the present invention.

FIG. 5 depicts a phasor diagram of the test specimen equation of motion, in accordance with embodiments of the present invention. The phasor diagram depicted in FIG. 5 shows a complex stiffness, which is equal to F/X, wherein F is the load amplitude and X is the displacement amplitude (i.e. ratio of load amplitude to displacement amplitude). Storage stiffness may be calculated in FIG. 5 with the following equation:

$$\text{Storage stiffness} = Kspec - Mspec\_eff * \omega^2 \quad \text{Eq. 7}$$

wherein F=load amplitude, X=displacement amplitude, ω=frequency (rad/seconds), Bspec=specimen damping constant, Kspec=specimen spring rate, and Mspec=effective specimen mass. Loss stiffness may be calculated in FIG. 5 with the following equation:

$$\text{Loss stiffness} = Bspec * \omega \quad \text{Eq. 8}$$

In exemplary embodiments, each leg of the phasor diagram is in units of stiffness or force divided by displacement. The complex stiffness may be represented by the hypotenuse, the spring rate may be represented on the real axis, damping constant multiplied by the frequency may be represented on the imaginary axis, and mass multiplied by the frequency squared may be represented on the real axis, as shown in FIG. 5.

Accordingly, if a specimen 15 is dynamically loaded at a given frequency (ω) and the load and deflection amplitudes are measured as well as the phase difference between the two waveforms, then the analyzing module 132 may calculate the damping constant and the spring rate of the specimen 15 being tested, during the test. The phasor diagram represents the variables: complex stiffness, the ratio of load amplitude to displacement amplitude, Bspec, the specimen damping constant which is related to loss stiffness, excitation frequency, ω, Kspec, the specimen spring rate, Mspec_eff, the effective specimen mass, and phase difference, δ. Because the analyzing module 132 knows the value of frequency based on a user input of a desired frequency, as well as the effective mass of the specimen (e.g. weighing the specimen prior to test) and the load and displacement amplitudes from receiving the signals from sensors 10, 20, the analyzing module 132 may be able to calculate Bspec, the specimen damping constant, and Kspec, the specimen spring rate. The Bspec and Kspec values are dynamic properties of the specimen, and thus the mass of the specimen may be required to determine the spring rate. The storage stiffness of the specimen has a spring rate element as well as an inertial element. Because the spring rate element may be the physical property which is desired to be measured, it may then be desirable to remove the inertial element from storage stiffness measurements to improve the accuracy of this value. The inertial element of the storage stiffness measurement can quickly become significant at high frequencies because the inertial element is related to frequency squared. Excitation at low frequencies may reduce this effect but would also have the drawback of reducing the accuracy of the loss stiffness measurement because the loss stiffness measurement is a function of phase which can become negligible at low frequencies.

Moreover, the parameter, Mspec_eff, in the phasor diagram may not be a pure mass of the specimen 15 as the Mspec_eff might weigh on a scale. Rather, the mass may have an effective mass as it relates to the inertial force required to accelerate and decelerate one side of the specimen being displaced by the actuator 12. When dynamically loading a specimen 15, the entire specimen 15 may not be moving in free air; the part of the specimen 15 near the fixed side of the clamp/fixture may not undergo any motion at all. The part of the specimen near the fixed side of the clamp/fixture may account for nearly zero inertial load because motion occurs near the actuator side of the clamp/fixture. The effective mass of the specimen may be closer to one-half (½) to one-third (⅓) of the pure weighed mass, depending on whether the specimen 15 is being loaded in pure tension/compression or if the specimen 15 is being loaded in bending or shear.

Accordingly, embodiments of the analyzing module 132 may determine the plurality of dynamic parameters of characteristics of a lumped system, or of the mechanical test device 50, rather than that of the specimen, due to the problem with estimating specimen spring rate as a result of the sensitivity of the spring rate estimate to the specimen mass estimate and the uncertainty in obtaining mass estimate. For example, a user may incorrectly weigh the specimen prior to a test, and thus the known effective mass of the specimen may be inaccurate and compromise the validity of the data. Further, the mass of the actuator 12 is significantly greater than a mass of the specimen, such that the mass of the specimen is negligible compared to the mass of the actuator 12, which means that using the mass of the system, such as the mechanical testing device 50, including the actuator 12, a user does not need to weigh a specimen 15 before a test, and the analyzing module 132 may characterize the dynamic properties of the testing system (i.e. "lumped").

Figure 6:
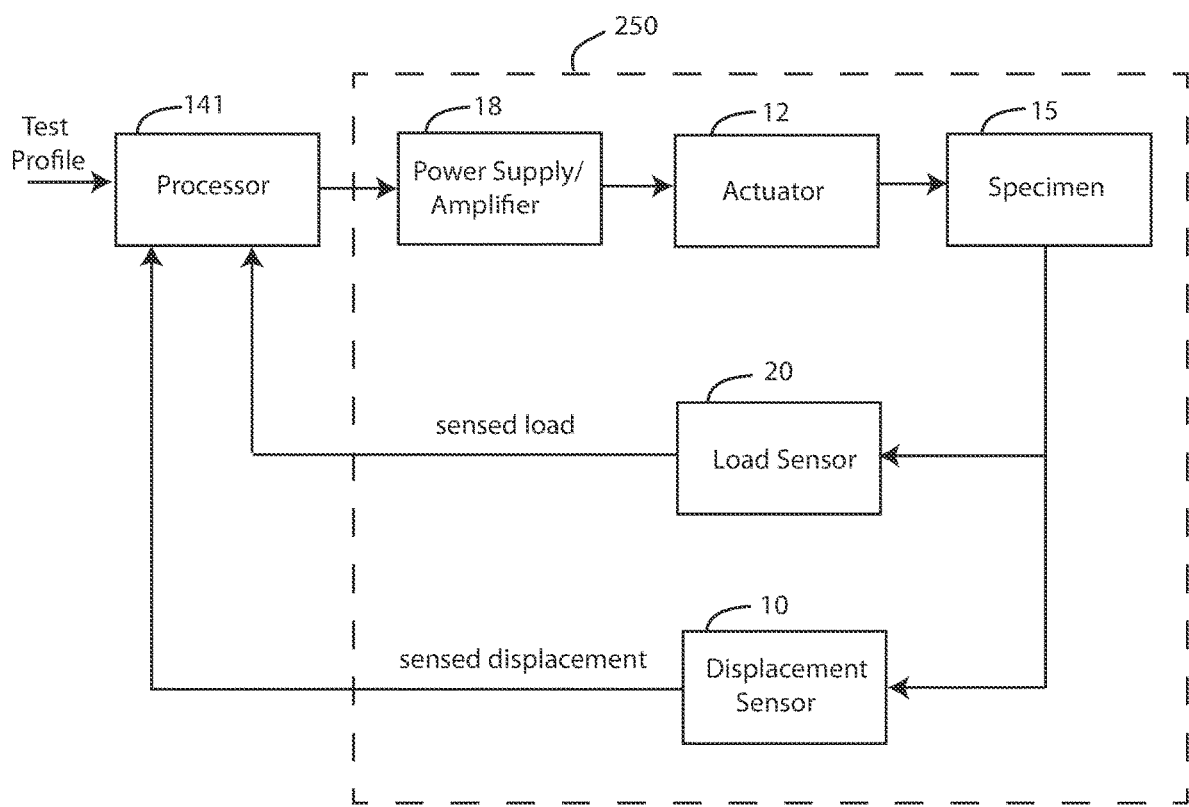
FIG. 6 depicts a block diagram of a closed loop actuator positioning position system, in accordance with embodiments of the present invention.

FIG. 6 depicts a block diagram of a closed loop actuator positioning position system, in accordance with embodiments of the present invention. The dashed lines represent the total lumped system 250, which includes a power supply/amplifier 18, actuator 12, specimen 15, load sensor 20, and displacement sensor 10. The identification of the lumped dynamics of the total system 250 may be characterized by the analyzing module 132, using a transfer function that is desired to implement adaptive control of the actuator 12. Because motor force is nearly proportional to motor current, it becomes possible to derive a lumped second-order approximation of all of the dynamics of the components contained within the dashed line shown in FIG. 6, using a similar methodology to that previously described. The transfer function relates sensed actuator position to amplifier (e.g. motor current) command. In an exemplary embodiment, the lumped system 250 dynamics can be characterized by the analyzing module 132 by commanding a dynamic current request to the power amplifier 18 while recording the current request and the resulting sensed actuator position. The dynamic excitation of the system may be a periodic sinusoid. The phase and magnitude relationship between the current command and resultant deflection can be used to derive a second-order approximation of the lumped system 250 dynamics. For example, the lumped, second-order approximation of the system transfer function may be calculated using the following equation, in Laplace form:

$$I(s)/X(s) = M \text{ lumped}(s)^2 + B \text{ lumped}(s) + K \text{ lumped} \qquad \text{Eq. 9}$$

Eq. 9 may be referred to as a lumped system stiffness transfer function.

Figure 7:
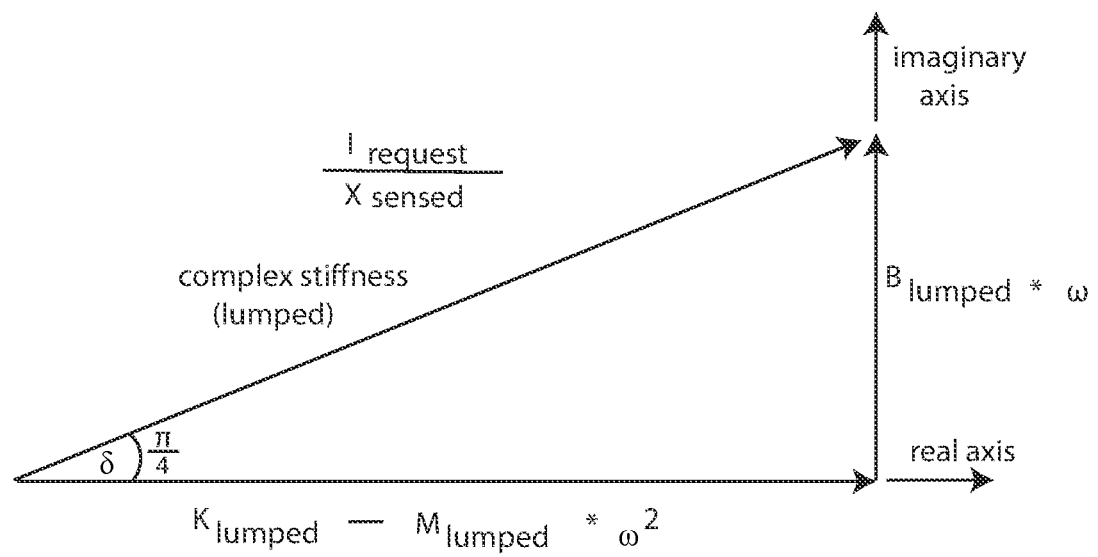
FIG. 7 depicts a phasor diagram of the lumped system equation of motion, in accordance with embodiments of the present invention.

With continued reference to the drawings, FIG. 7 depicts a phasor diagram of the lumped system equation of motion, in accordance with embodiments of the present invention. The phasor diagram depicted in FIG. 7 shows a complex stiffness, which is equal to I request/X, wherein I request is the requested motor current amplitude, and X is the sensed displacement amplitude. The phasor diagram also depicts the following equations:

$$\text{Storage stiffness} = K \text{ lumped} - M \text{ lumped} * \omega^2 \qquad \text{Eq. 10}$$

wherein ω=frequency (rad/seconds), B lumped=lumped system damping, K lumped=lumped system spring rate, and M lumped=lumped system mass. Loss stiffness may be calculated in FIG. 8 with the following equation:

$$\text{Loss stiffness} = B \text{ lumped} * \omega \qquad \text{Eq. 11}$$

wherein ω=frequency (rad/seconds), B lumped=lumped system damping.

The parameter, M lumped may represent the lumped effective mass of the lumped system 250 (e.g. mechanical testing device 50). Characterizing the mass of the lumped system may be useful because the mass of the mechanical testing device 50 is dominated by the mass of the motor armature and any fixturing and clamps attached, while a mass of the test specimen becomes a negligible component of the lumped system 250 dynamic parameters. In an exemplary embodiment, M lumped could be characterized by the analyzing module 132 using a routine at a beginning of a test and could remain valid until any appreciable mass (e.g. clamps or fixtures) is added or removed from the lumped system 250. Furthermore, M lumped may not change over the course of a test. With a lumped mass value that is straightforward to estimate and is constant over time, embodiments of the analyzing module 132 may obtain estimates of a plurality of dynamic parameters/characteristics of the mechanical testing device 50, such as a lumped damping and a lumped spring rate.

Referring back to FIG. 1, embodiments of the computing system 120 may also include a calculating module 133. Embodiments of the calculating module 133 may include one or more components of hardware and/or software program code for calculating a current request using the plurality of dynamic characteristics. For instance, embodiments of the calculating module 133 may utilize the dynamic parameters of a lumped system 250 (e.g. overall testing system) to calculate a current request having an amplitude that may represent an electrical current applied to the actuator 12 for controlling the actuator 12. Embodiments of the calculating module 133 may thus utilize the mass of the lumped system, the lumped damping constant, and the lumped spring rate to calculate a current request that applies a mechanical load to the specimen that either removes load or adds load to track a user's desired load, input by the user for example, at a beginning of the test. Because the calculating module 133 may calculate a new current request after a period of time, such as an update period, or after each cycle of a waveform generated to apply the mechanical load to the specimen 15, the actuator 15 may be consistently and/or continuously adjusted (e.g. kept stable) to track the user's desired performance of the actuator 12, regardless of a condition of the environment of the testing system (e.g. over a vast temperature range).

In an exemplary embodiment, the current reference may be calculated by utilizing closed loop control techniques, PID techniques, etc. For example, embodiments of the calculating module 133 may utilize the mass of the lumped system, the lumped damping constant, and the lumped spring rate that describe a characteristic equation of the plant transfer function to calculate a software spring rate (e.g. proportional gain) and a software damping (e.g. derivative gain) that may result in closed loop actuator motion control that is well behaved (e.g. stable and non-oscillatory).

Embodiments of the computing system 120 may further include an actuator control module 134. Embodiments of the actuator control module 134 may include one or more components of hardware and/or software program code for controlling the actuator 12 based on the plurality of dynamic characteristics to track a desired performance of the actuator, using the current request calculated by the calculating module 133. For instance, the actuator control module 12 may manipulate, control, affect, etc. the actuator 12 in accordance with the closed loop control, to effectuate a physical application of a mechanical load to the specimen 15

Due to the nature of a DMA test where the test specimen 15 is being dynamically loaded in a periodic, sinusoidal fashion, it is possible to characterize the lumped system dynamics simultaneously as the test is running, and makes it possible to adaptively derive control parameters for the actuator throughout the test as the specimen dynamics change. Changes in specimen dynamics, such as lumped spring rate, K lumped, and lumped damping, B lumped may occur and vary throughout the test, and the software control gains calculated by the calculating module 133 of the computing system 120 can be modified accordingly to maintain good actuator motion control.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the actuator control system 100 may improve mechanical testing technology by adaptively controlling an actuator during test operations, which can vary from test-to-test. For example, the actuator control system 100 may result in a robust, stable control of a test system actuator 12 over an entire range of system dynamics encountered during a single test over a broad range of environmental conditions. A user may request a desired frequency and load for a given test of a given specimen using the mechanical testing device 50. Based on a set of rules, a current request can be determined to physically control an actuator of a mechanical testing machine, the rules being applied to dynamic properties of the machine, specimen, and/or environmental condition during the tests, collected by multiple hardware sensors. As shown in FIGS. 3-7, rules are used to calculate and interpret various data received from physical sensor and hardware devices, testing a physical, real-world sample.

Figure 8:
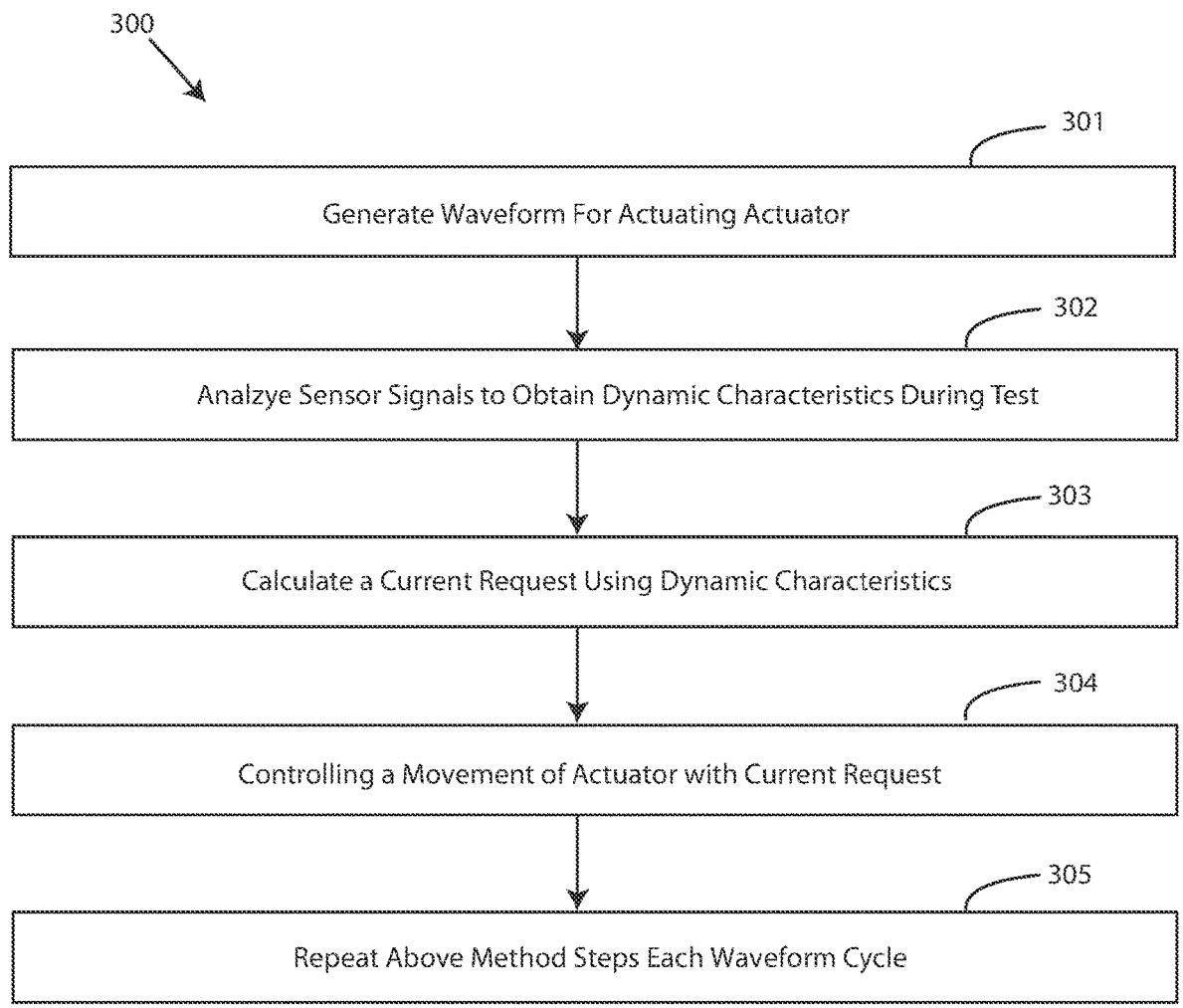
FIG. 8 depicts a flow chart of a method for adaptively controlling an actuator of a mechanical testing device during a test of a specimen, in accordance with embodiments of the present invention.

Referring now to FIG. 8, which depicts a flow chart of a method 300 for adaptively controlling an actuator 12 of a mechanical testing device 50 during a test of a specimen 15, in accordance with embodiments of the present invention. One embodiment of a method 300 or algorithm that may be implemented for adaptively controlling an actuator 15 of a mechanical testing device 50 during a test of a specimen 15 using a mechanical testing device with the actuator control system 100 described in FIGS. 1-7 using one or more computer systems as defined generically in FIG. 9 below, and more specifically by the specific embodiments of FIG. 1.

Embodiments of the method 300 for adaptively controlling an actuator of a mechanical testing device during a test of a specimen using a mechanical testing device, in accordance with embodiments of the present invention, may begin at step 301 wherein a waveform is generated for actuating the actuator 12. Step 302 analyzes sensor 10, 20 signals to obtain dynamic characteristics during a test of the specimen 15. Step 303 calculates a current request using the dynamic characteristics derived in step 302. Step 304 controls a movement of the actuator 12 with the current request to stabilize the actuator 12 throughout a length of the test. Step 305 repeats steps 301-304 periodically, for example, each cycle.

Figure 9:
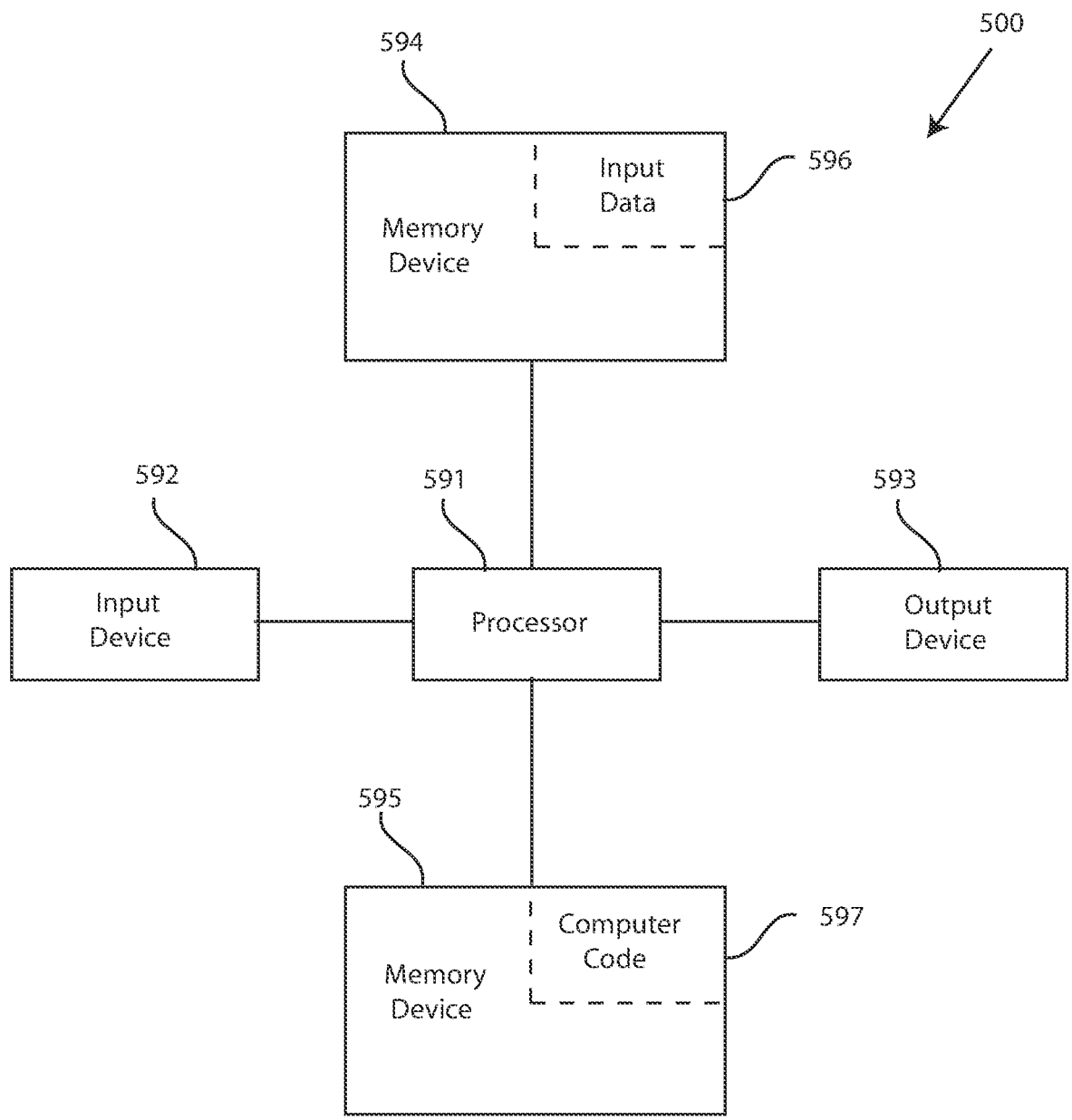
FIG. 9 depicts a block diagram of a computer system for the actuator control system of FIGS. 1-7, capable of implementing for adaptively controlling an actuator of a mechanical testing device during a test of a specimen of FIG. 8, in accordance with embodiments of the present invention.

FIG. 9 depicts a block diagram of a computer system for the actuator control system 100 of FIGS. 1-7, capable of implementing methods for adaptively controlling an actuator of a mechanical testing device during a test of a specimen of FIG. 8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for adaptively controlling an actuator of a mechanical testing device during a test of a specimen in the manner prescribed by the embodiments of FIG. 8 using the actuator control system 100 of FIGS. 1-7, wherein the instructions of the computer code 597 may be executed by processor 591 via memory device 595. The computer code 597 may include software or program instructions that may implement one or more algorithms for implementing the method for adaptively controlling an actuator of a mechanical testing device during a test of a specimen, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to actuator control systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to adaptively control an actuator of a mechanical testing device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for adaptively controlling an actuator of a mechanical testing device during a test of a specimen. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for adaptively controlling an actuator of a mechanical testing device during a test of a specimen.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for adaptive control of an actuator during a test of a specimen using a mechanical testing device, the method comprising:
  applying a mechanical load to the specimen with the actuator, resulting in receiving a load sensor signal from a load sensor and a displacement sensor signal from a displacement sensor;
  deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and
  controlling the actuator based on the derived lumped dynamics of the mechanical testing device such that the controlling results in a stable motion.

2. The method of claim 1, wherein the deriving the lumped dynamics includes at least one of:
  determining a lumped spring rate of the mechanical testing device, the lumped spring rate comprising an approximation of a respective spring rate of each of the plurality of dynamic components contained within the mechanical testing device as the test is running; and determining a lumped damping constant of the mechanical testing device, the lumped damping constant comprising an approximation of respective damping constants of each of the plurality of dynamic components contained within the mechanical testing device as the test is running.

3. The method of claim 2, further comprising calculating a software spring rate and a software dampening, using the dynamically determined lumped spring rate and the dynamically determined lumped damping constant that would result in the stable motion.

4. The method of claim 3, wherein at least one of the lumped spring rate is derived from a storage stiffness of the specimen and the lumped damping is derived from a loss stiffness of the specimen.

5. The method of claim 1, wherein the actuator is controlled with a current request calculated using the derived lumped dynamics according to a closed loop control, the current request increasing or decreasing the mechanical load applied to the specimen during the test.

6. The method of claim 1, wherein an environmental condition of the test changes throughout the test, affecting the derived lumped dynamics of the mechanical testing system.

7. The method of claim 1, wherein the stable motion is a sinusoidal waveform at a desired frequency.

8. A mechanical testing system comprising:
  a mechanical testing device, the mechanical testing device including a motor, a load sensor and a displacement sensor; and
  a computing system coupled to the mechanical testing device, the computing system having a processor, a memory device coupled to the processor, and a computer readable storage device coupled to the processor;
  wherein the storage device contains program code executable by the processor via the memory device to implement a method for adaptively controlling an actuator of the mechanical testing device during a test of a specimen, the method comprising:
    applying a mechanical load to the specimen with the actuator, resulting in receiving a load sensor signal from a load sensor and a displacement sensor signal from a displacement sensor;
    deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and
    controlling the actuator based on the derived lumped dynamics of the mechanical testing device such that the controlling results in a stable motion.

9. The mechanical testing system of claim 8, wherein the deriving the lumped dynamics includes at least one of:
  determining a lumped spring rate of the mechanical testing device, the lumped spring rate comprising an approximation of a respective spring rate of each of the plurality of dynamic components contained within the mechanical testing device as the test is running; and
  determining a lumped damping constant of the mechanical testing device, the lumped damping constant comprising an approximation of a respective damping constant of each of the plurality of dynamic components contained within the mechanical testing device as the test is running.

10. The mechanical testing system of claim 9, the method further comprising calculating a software spring rate and a software dampening, using the dynamically determined lumped spring rate and the dynamically determined lumped damping constant that would result in the stable motion.

11. The mechanical testing system of claim 10, wherein at least one of the lumped spring rate is derived from a storage stiffness of the specimen and the lumped damping is derived from a loss stiffness of the specimen.

12. The mechanical testing system of claim 8, wherein the actuator is controlled with a current request calculated using the derived lumped dynamics according to a closed loop control, the current request increasing or decreasing the mechanical load applied to the specimen during the test.

13. The mechanical testing system of claim 8, wherein an environmental condition of the test changes throughout the test, affecting the derived lumped dynamics of the mechanical testing system.

14. The mechanical testing system of claim 8, wherein the stable motion is a sinusoidal waveform at a desired frequency.

15. A computer program product, comprising a computer readable hardware storage device storing a computer readable program code, the computer readable program code comprising an algorithm that when executed by a computer processor of a computing system implements a method for adaptively controlling an actuator of a mechanical testing device during a test of a specimen, the method comprising:
  applying a mechanical load to the specimen with the actuator, resulting in receiving a load sensor signal from a load sensor and a displacement sensor signal from a displacement sensor;
  deriving lumped dynamics of the mechanical testing device by analyzing a phase and magnitude relationship between a current command of a motor of the mechanical testing device and a resultant deflection of the specimen, wherein the lumped dynamics include an approximation of at least one dynamic property for a combined plurality of dynamic components contained within the mechanical testing device as the test is running; and
  controlling the actuator based on the derived lumped dynamics of the mechanical testing device such that the controlling results in a stable motion.

16. The computer program product of claim 15, wherein the deriving the lumped dynamics includes at least one of:
  determining a lumped spring rate of the mechanical testing device, the lumped spring rate comprising an approximation of a respective spring rate of each of a plurality of dynamic components contained within the mechanical testing device as the test is running; and
  determining a lumped damping constant of the mechanical testing device, the lumped damping constant comprising an approximation of respective damping constant of each of a plurality of dynamic components contained within the mechanical testing device as the test is running.

17. The computer program product of claim 16, the method further comprising calculating a software spring rate and a software dampening, using the dynamically determined lumped spring rate and the dynamically determined lumped damping constant that would result in the stable motion.

18. The computer program product of claim 17, wherein at least one of the lumped spring rate is derived from a storage stiffness of the specimen and the lumped damping is derived from a loss stiffness of the specimen.

19. The computer program product of claim 15, wherein the actuator is controlled with a current request calculated using the derived lumped dynamics according to a closed loop control, the current request increasing or decreasing the mechanical load applied to the specimen during the test.

20. The computer program product of claim 15, wherein an environmental condition of the test changes throughout the test, affecting the derived lumped dynamics of the mechanical testing system.

* * * * *